Patented Dec. 6, 1949

2,490,573

UNITED STATES PATENT OFFICE 2,490,573

PROCESS FOR THE MANUFACTURE OF PHOSPHORUS COMPOUNDS

Frank Ratcliffe Atherton, Cambridge, and Franz Bergel, Aaron Cohen, and John Wynne Haworth, Welwyn Garden City, Harry Tacon Openshaw, Manchester, and Alexander Robertus Todd, Cambridge, England, assignors to Hoffmann-La Roche, Inc., Nutley, N. J.

No Drawing. Application March 14, 1947, Serial No. 734,880. In Great Britain December 22, 1944

Section 1, Public Law 690, August 8, 1946
Patent expires December 22, 1964

10 Claims. (Cl. 260—234)

This invention relates to a process for the manufacture of phosphorus compounds, and is particularly concerned with the manufacture of ortho-phosphoric acid esters and amides of organic compounds containing hydroxy or amino groups, respectively, attached to a carbon atom, by a process whereby the compounds containing the hydroxy or amino groups are converted into the ortho-phosphoric acid esters and amides, such process being referred to hereinafter as a "phosphorylation."

Hitherto phosphorylation has been achieved by the action of phosphorus pentoxide or ortho-phosphoric acid or its halides or salts on hydroxy compounds or by the action of phosphorus oxychloride on amines, if necessary in the presence of a condensing agent such as alkali or pyridine (see Centralblatt, 1898, I, 1263; Centralblatt, 1899, I, 813; Centralblatt, 1900, II, 431; Centralblatt, 1906, I, 1523; Centralblatt, 1926, II, 779; and United Kingdom Patent Specifications Nos. 527,499, 534,150 and 547,764). Phosphorylations have been carried out using ethyl metaphosphate (Langheld, Ber. 43, 1857). Phenyl dichlorphosphinate (Gulland and Hobday, J. C. S., 1940, 746) and diphenyl chlorphosphonate (Brigl and Muller, Ber. 72, 2121) have also been used, the phenyl residues being removed by catalytic hydrogenation or by hydrolysis. The mono- and di-aniline derivatives of phosphorus oxychloride (Zetsche and Buttiker, Ber. 73, 47) have been employed as phosphorylating agents, the aniline being removed from the resulting products by means of acetic acid. Certain phosphates have been obtained by opening ethylene oxide rings with aqueous sodium phosphate (Bailly, Compt. Rend. 161, 679).

Zervas (Naturwissenschaften, 1939, 317) described the preparation of glucose phosphate by the reaction of acetobromoglucose and silver dibenzyl phosphate with subsequent hydrogenation to remove the benzyl groups.

All these methods are of limited applicability and the conditions vary widely from case to case.

According to the present invention we have found that dibenzyl halogenophosphonates are very convenient phosphorylating agents. The only previous mention of such compounds was by Zervas (loc. cit.) who states that dibenzyl chlorophosphonate may be obtained by the chlorination of dibenzyl hydrogen phosphate, but gives no experimental details and emphasises that his product was so unstable as to be of little use for phosphorylation.

We have now discovered that dibenzyl halogenophosphonates are very convenient phosphorylating agents when used in the form of solutions in inert solvents such as chloroform, carbon tetrachloride, benzene and ether.

According to the process of the present invention for the manufacture of ortho-phosphoric acid esters and amides an organic compound containing a hydroxyl or amino group is treated with a solution of a dibenzyl halogenophosphonate in an inert solvent such as carbon tetrachloride, chloroform, ether, or benzene, and if necessary in the presence of a suitable base. Where the organic compound to be phosphorylated is phenolic it is advantageous to treat the alkali metal salt of the phenol with the dibenzyl halogenophosphonate. In general anhydrous conditions are preferred. By this means esters or amides of dibenzyl phosphoric acid result. The free phosphoric acid derivatives or corresponding salts can be obtained conveniently by removing the benzyl groups by means of catalytic hydrogenation, which, in certain cases, is best carried out in the presence of sufficient tertiary base to neutralise the acidic groups liberated.

The processes of the present invention and the preparation of the dibenzyl halogenophosphonates are illustrated but not restricted by the following examples:

EXAMPLE 1

(a) *Dibenzyl phosphite*

A solution of phosphorus trichloride (147.5 gms.) in benzene (1500 ccs.) is cooled in ice and a mixture of benzyl alcohol (216 gms.) and dimethylaniline (242 gms.) added dropwise with stirring over a period of 2½ hours. After stirring for a further ½ hour, a second portion of benzyl alcohol (108 gms.) is added over a period of ¾ hour, and the mixture allowed to stand for another hour. It is then filtered, the filtrate washed first with water, then dilute ammonia and again with water. After drying with sodium sulphate the benzene and benzyl chloride formed in the reaction are removed by distillation under reduced pressure. The residue is dibenzyl phosphite which is obtained in good yield and may be further purified by distillation in a good vacuum, preferably in a molecular still. Heating above 180° C. tends to cause decomposition.

Dibenzyl phosphite can also be obtained by taking a mixture of benzyl alcohol (130 gms.), pyridine (90 gms.), dry ether (250 ccs.), cooling in ice, and adding dropwise with stirring, phosphorus trichloride (55 gms.). The reaction mixture is filtered and washed as before, and the ether and benzyl chloride removed by distillation. The residue is distilled in a good vacuum when dibenzyl phosphite is obtained as a colourless liquid, B. Pt. 160–164° C./0.1 mm. In this experiment some tribenzyl phosphite, B. Pt. 205–210° C./0.2 mm. is also obtained.

(b) *Dibenzyl chlorophosphonate and dibenzyl bromophosphonate*

Dibenzyl phosphite (26.2 gms.) is dissolved in carbon tetrachloride (450 ccs.) and cooled in a freezing mixture. A standard solution of chlorine in carbon tetrachloride (210 ccs. of a N solution) is then added dropwise with stirring over a period of 40 minutes, at −5° to −10° C. A stream of nitrogen is then blown through the solution for 1½ hours to remove excess chlorine and hydrogen chloride formed in the reaction. This gives a solution of dibenzyl chlorophosphonate in carbon tetrachloride.

By using 16 gms. of bromine dissolved in carbon tetrachloride in place of the chlorine, dibenzyl bromophosphonate is obtained. The same procedures may be carried out using chloroform or benzene as a solvent. Any attempt to distil these compounds results in decomposition.

The compounds thus produced are characterised by the production of dibenzyl aminophosphonate as follows:

Dry ammonia is passed into a solution of dibenzyl chlorophosphonate or dibenzyl bromophosphonate formed in the above manner, when a white precipitate is immediately formed. This is filtered, washed with water and dried to give the required dibenzyl aminophosphonate as a white solid, of M. Pt. 102–103° C. A further small quantity is obtained by evaporating the solvent. The yield of this crude product is almost quantitative. Recrystallisation from hot carbon tetrachloride gives needles of M. Pt. 103–104° C.

The same product is also obtained if the dibenzyl chlorophosphonate solution is shaken with strong aqueous ammonia.

EXAMPLE 2

*Dibenzyl anilinophosphonate*

An excess of aniline is added to a solution of dibenzyl chlorophosphonate, and allowed to stand overnight at room temperature. The resulting mixture is filtered, the filtrate washed with dilute hydrochloric acid, then with water, dried over sodium sulphate, and the carbon tetrachloride removed by distilling under reduced pressure. The residue forms a crystalline mass on cooling and is the required dibenzyl anilinophosphonate. The crude substance melts at 82–85° C. and is obtained in almost quantitative yield. Crystallisation from a mixture of hexane and ethylene dichloride raises the melting point to 86–87° C.

EXAMPLE 3

*Ethyl dihydrogen phosphate*

To a solution of dibenzyl chlorophosphonate prepared as described previously from 6.55 gms. of dibenzyl phosphite in 165 ccs. of carbon tetrachloride is added 20 ccs. of absolute alcohol and 50 ccs. of pyridine. The mixture is left overnight at room temperature, then washed with water, dilute mineral acid, and again with water. The solvent is then evaporated under reduced pressure leaving dibenzyl ethyl phosphate as a yellow oil. The ethyl dihydrogen phosphate can be obtained by dissolving 2.0 gms. of this oil in 50 ccs. of aqueous methanol and catalytically hydrogenating the solution using a palladium charcoal catalyst, and hydrogen slightly above atmospheric pressure. The resulting solution is evaporated to small bulk and made just alkaline to phenolphthalein with aqueous baryta. The resulting solution on concentrating, deposits the barium salt of ethyl dihydrogen phosphate as a white crystalline solid.

EXAMPLE 4

*Glucose 6-phosphate*

A solution of dibenzyl chlorophosphonate is prepared as described previously from 26.2 gms. of dibenzyl phosphite. Pyridine (100 ccs.) is then added and the carbon tetrachloride removed by distillation under reduced pressure. The resulting solution is added to a solution of monoacetone-glucose (22 gms.) in pyridine (300 ccs.) cooled to −5° C. After standing overnight the solvent is removed by distillation under reduced pressure, the residue is dissolved in water and made just alkaline to phenolphthalein with caustic soda solution. After evaporation, the residue is evaporated several times with alcohol and finally extracted with chloroform. Evaporation of the chloroform leaves the dibenzyl ester of monoacetone glucose 6-phosphate.

This is dissolved in ethyl alcohol (600 ccs.), dimethylcyclohexylamine (24 gms.) added, and catalytically hydrogenated using a platinum oxide catalyst. After filtering the catalyst, the filtrate is evaporated under reduced pressure maintaining neutral to phenolphthalein with baryta solution. The resulting barium salt is dissolved in ethyl alcohol and isolated by precipitation with ethyl acetate. This gives the barium salt of monoacetoneglucose 6-phosphate $[\alpha]_D$. −5.35. Hydrolysis of the acetone group is carried out by boiling for 3 hours with N/10 $H_2SO_4$, the resulting glucose 6-phosphate being isolated as its barium salt $[\alpha]_D$, 12.2°.

EXAMPLE 5

*Phenyl dihydrogen phosphate*

To a solution of dibenzyl chlorophosphonate prepared from 5.2 gms. of dibenzyl phosphite, 100 ccs. of carbon tetrachloride, and 1.45 gms. of chlorine, is added with stirring 2.5 gms. of powdered anhydrous sodium phenate. The mixture is stirred 2 hours at 0° C. and then left overnight at room temperature. Solid is filtered and the filtrate washed with sodium carbonate, then water and dried over sodium sulphate. Solvent is removed under reduced pressure, and the residue is heated to 130° C. at a pressure of 0.2 mm. to remove volatile material. This leaves dibenzyl phenyl phosphate, which is obtained in good yield, and on cooling forms a crystalline solid of M. Pt. 38° C. The benzyl groups are removed by dissolving the product in aqueous methanol, and catalytically hydrogenating using a palladium charcoal catalyst. Two molecular proportions of hydrogen are rapidly adsorbed, and the catalyst is then filtered. The filtrate is evaporated to dryness, when the phenyl dihydrogen phosphate is obtained as a white solid, of M. Pt. 98–99° C., after crystallisation from chloroform, and showing no depression in melting point on admixture with a sample of phenyl dihydrogen phosphate prepared by hydrolysing phenyl dichlorophosphinate with hot water.

EXAMPLE 6

Dibenzyl p-sulphonamidophenylamino-phosphonate

A solution of dibenzyl chlorophosphonate is prepared by passing gaseous chlorine (3.0 gms.) into a mixture of dibenzyl phosphite (17.6 gms.), pyridine (8.0 gms.) and ether (20 ccs.), cooled to −5° C. To this is added a solution of p-aminobenzene sulphonamide (6.0 gms.) in pyridine (10 ccs.), and the mixture left overnight at room temperature. It then consists of two layers which are separated. Addition of ether to the upper layer (which consists mainly of ether and pyridine) precipitates a solid, which after filtering and washing with water melts at 170–172° C. The lower layer consists mainly of pyridine hydrochloride and other water-soluble substances together with further amounts of the solid, of M. Pt. 170–172° C., and on addition of 200 ccs. of water this is precipitated as a light brown solid. Crystallised from alcohol it melts at 174° C., and analysis shows it to be the dibenzyl ester of the phosphoric acid derivative of sulphanilamide. That it has the formula indicated below is confirmed by the fact that it is not possible to diazotise the product.

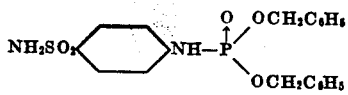

EXAMPLE 7

3.4-dimethylribitylaminobenzene-5'-phosphate

To a solution of 3.4-dimethylribitylaminobenzene (5.0 gms.) in 100 ccs. of pyridine is added dropwise with stirring and ice-cooling a solution of 5.5 gms. of dibenzylchlorophosphonate in 85 ccs. of carbon tetrachloride. After the addition is completed the mixture is left overnight at room temperature and solvents evaporated under reduced pressure. The residue is made alkaline to litmus with aqueous caustic soda, and water and pyridine again evaporated under reduced pressure. The residue is taken up in 65 ccs. of butanol, washed with dilute hydrochloric acid, dilute ammonia, finally with water, and the butanol evaporated under reducer pressure when the crude dibenzyl derivative of 3.4-dimethylribitylaminobenzene phosphate remains as a viscous oil, and has the following probable constitution:

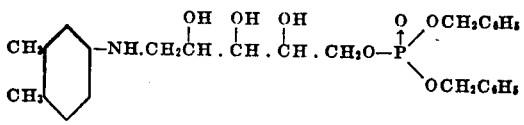

This is dissolved in ethanol and hydrogenated using a palladised charcoal catalyst. When the hydrogenation is completed the catalyst is filtered and the solution neutralised with a solution of sodium ethylate in alcohol. The precipitated sodium salt of the 3.4-dimethylribitylaminobenzene phosphate is centrifuged and dissolved in water. Barium chloride is added equivalent to the sodium content, the solution filtered and evaporated to small bulk when the barium salt of the required phosphorylated 3.4-dimethylribitylaminobenzene separates as a white solid.

EXAMPLE 8

2-methyl-1.4-naphthohydroquinone diphosphate

To 8.83 gms. of anhydrous disodium salt of 2-methyl-1.4-naphthohydroquinone (prepared from 2-methyl-1.4-naphthohydroquinone and sodium methylate in methanol solution in a hydrogen atmosphere, followed by evaporation of the methanol in vacuo) is added a solution of 29.2 gms. of dibenzylchlorophosphonate in 400 ccs. of carbon tetrachloride. The mixture is cooled in ice, and shaken in an inert atmosphere for an hour and then left overnight at room temperature. The solution is then washed with dilute caustic soda solution, and with water, dried over sodium sulphate, and the carbon tetrachloride evaporated in vacuo. The crude tetrabenzyl-2-methyl-1.4-naphthohydroquinone diphosphate remains as a red oil. This is dissolved in 120 ccs. of ethanol and hydrogenated using a palladium charcoal catalyst. When the hydrogenation is completed the catalyst is filtered and the solvent evaporated under reduced pressure, leaving crude 2-methyl-1.4-naphthohydroquinone diphosphate. This is purified by dissolving it in 50 ccs. of water and extracting twice with ether. The ethereal extracts are discarded and the aqueous layer extracted four times with 30 ccs. of butanol. The butanol extracts are combined, the butanol evaporated under reduced pressure and the residue neutralised with saturated aqueous baryta. The solution is treated with decolourising charcoal, filtered and boiled, when the dibarium salt of 2-methyl-1.4-naphthohydroquinone diphosphate is precipitated as a white solid, which is filtered, washed with hot water, and dried.

EXAMPLE 9

Hexoestrol diphosphate

To a solution of 1.1 gms. of dibenzylchlorophosphonate in 25 ccs. of carbon tetrachloride is added 0.6 gms. of the anhydrous disodium salt of 3.4-di-(p-hydroxyphenyl) hexane (hexoestrol). The mixture is shaken for half an hour, left to stand overnight at room temperature, and then washed with aqueous sodium bicarbonate and with water. The carbon tetrachloride is evaporated, leaving a solid residue which after crystallising from alcohol melts at 110° C. This is the tetrabenzyl ester of hexoestrol diphosphate of the following formula:

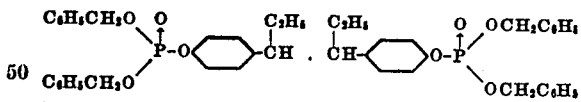

When dissolved in alcohol this is readily hydrogenated using a palladium charcoal catalyst, and after filtering the catalyst, and evaporating solvent under reduced pressure, hexoestrol diphosphate of the following formula

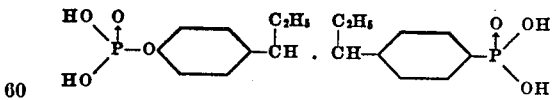

remains as a white solid.

EXAMPLE 10

Glucose-6-phosphate from d-glucose

A solution of 29.6 grams of dibenzyl chlorophosphonate, prepared as described above, in 200 ccs. of dry chloroform is added to a solution of 18 gms. of α-d-glucose in 300 ccs. of pure dry pyridine. The period of addition is one hour and the temperature of the reaction is maintained between −5° C. and −10° C. After the addition the mixture is allowed to stand at room temperature for two hours and then it is cooled whilst 52 ccs. of pure refractionated acetic anhydride is added with stirring, the temperature being maintained between —5° C. and +3° C. The mixture is allowed to stand at room temperature for 12 hours after which time the bulk of the solvent is removed in vacuo and the syrupy pale yellow residue dissolved in chloroform and extracted with 0.5 N hydrochloric acid until all the pyridine is removed. The chloroform solution is washed with distilled water and then dried over anhydrous sodium sulphate and evaporated in vacuo. The residue, containing the dibenzyl glucose-6-phosphate, is then dissolved in alcohol, evaporated in vacuo to remove traces of chloroform and is then made up to 260 ccs. with alcohol.

A 52 ccs. portion of the above solution is diluted to 500 ccs. with a further portion of alcohol and then hydrogenated at room temperature and a pressure of 130 atmospheres of hydrogen using Raney nickel as catalyst. The reaction mixture is then neutralised with baryta, using phenol phthalein as indicator, evaporated under reduced pressure and then dissolved in water. It is filtered free from insoluble salts through a suitable filter bed and the bulk of the resulting solution made up to 150 ccs.

A portion of the above solution (120 ccs.) is titrated with sulphuric acid (about 25 ccs. of N sulphuric acid are required) to remove barium quantitatively, using rhodizonic acid as indicator. The precipitated barium sulphate is filtered off through a filter bed and to the filtrate a solution of 11.9 gms. of brucine hydrate in 20 ccs. of methanol is added. The solution is shaken with charcoal and evaporated under reduced pressure several times with alcohol, when the crude dibrucine salt of glucose 6-phosphate separates. After recrystallisation from methanol hygroscopic micro-crystals are obtained having $[\alpha]_D^{21} = -19.6°\ (\pm 0.4°)$.

The term "halogen" as used herein refers to chlorine and bromine only and excludes iodine and fluorine.

What we claim is:

1. A process for the manufacture of orthophosphoric acid esters and amides which comprises treating an organic compound selected from the group consisting of alcohols, phenols, and primary amines with a solution of a dibenzylhalogenophosphonate selected from the group consisting of dibenzyl chlorophosphonate and dibenzyl bromophosphonate in an inert solvent.

2. A process as in claim 1, wherein the reaction is carried out under anhydrous conditions.

3. A process as in claim 1, wherein the reaction is carried out in the presence of a dehydrohalogenating base.

4. A process as in claim 1, wherein the reaction is carried out in the presence of an organic tertiary nitrogen base.

5. A process as in claim 1, wherein the dibenzylhalogenophosphate is dibenzyl chlorophosphonate.

6. A process for the manufacture of orthophosphoric acid esters as in claim 1, wherein the phenols are employed in the form of their alkali metal salts.

7. A process for the manufacture of orthophosphoric acid esters and amides which comprises treating an organic compound selected from the group consisting of alcohols, phenols and primary amines with a solution of a dibenzylhalogenophosphonate selected from the group consisting of dibenzyl chlorophosphonate and dibenzyl bromophosphonate in an inert solvent, and subjecting the product thus obtained to catalytic hydrogenation to remove the benzyl groups.

8. A process for the manufacture of glucose 6-phosphate which comprises treating monoacetone glucose with a solution of dibenzyl chlorophosphonate in an inert solvent in the presence of an organic base to produce the dibenzyl ester of monoacetone glucose 6-phosphate, catalytically hydrogenating the said dibenzyl ester of monoacetone glucose 6-phosphate to produce monoacetone glucose 6-phosphate and hydrolysing the said monoacetone glucose 6-phosphate to produce glucose 6-phosphate.

9. A process for the manufacture of hexoestrol diphosphate which comprises treating the anhydrous disodium salt of hexoestrol with a solution of dibenzyl chlorophosphonate in an inert solvent to produce the tetrabenzyl ester of hexoestrol diphosphate and catalytically hydrogenating the said tetrabenzyl ester of hexoestrol diphosphate to produce hexoestrol diphosphate.

10. A process for the manufacture of 2-methyl-1.4 - naphthohydroquinone diphosphate which comprises treating the anhydrous disodium salt of 2-methyl-1.4-naphthohydroquinone with a solution of dibenzylchlorophosphonate in an inert solvent to produce tetrabenzyl-2-methyl-1.4-naphthohydroquinone diphosphate and catalytically hdrogenating the said tetrabenzyl-2-methyl-1.4-naphthohydroquinone diphosphate to produce 2-methyl-1.4-naphthohydroquinone diphosphate.

FRANK RATCLIFFE ATHERTON.
FRANZ BERGEL.
AARON COHEN.
JOHN WYNNE HAWORTH.
HARRY TACON OPENSHAW.
ALEXANDER ROBERTUS TODD.

REFERENCES CITED

The following references are of record in the file of this patent:

UNITED STATES PATENTS

| Number | Name | Date |
|---|---|---|
| 2,176,416 | Britton et al. | Oct. 17, 1939 |
| 2,394,829 | Whitehill et al. | Feb. 12, 1946 |
| 2,426,691 | Jenkins | Sept. 2, 1947 |

OTHER REFERENCES

Atherton et al., "Jour. Chem. Soc." (London), vol. 1945, pp. 660–663.

Deutsch et al., "Nature," vol. 156 (November 17, 1945), page 604.

Zervas, "Naturwissenschaften," vol. 27 (1939), page 317.

"Chemical Abstracts," vol. 34 (1940), columns 3237–3238 (Abstract of original by Brigl and Muller) in Berichte deutsch. Chem. Ges., vol. 72 (1939), pages 2121–2130.

"Chemical Abstracts," vol. 39 (October 20, 1945), columns 4596–4597 (abstract of original by Atherton et al.) in J. Chem. Soc. 1945, pages 382–385.

Certificate of Correction

Patent No. 2,490,573

December 6, 1949

FRANK RATCLIFFE ATHERTON ET AL.

It is hereby certified that errors appear in the printed specification of the above numbered patent requiring correction as follows:

Column 5, line 48, for the word "reducer" read *reduced*; column 7, line 60, for "benzylhalogenophosphate" read *benzylhalogenophosphonate*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*